United States Patent
Zhong et al.

(10) Patent No.: US 11,909,443 B2
(45) Date of Patent: Feb. 20, 2024

(54) ROF COMMUNICATION REMOTE MACHINE AND ROF SYSTEM

(71) Applicant: Comba Network Systems Company Limited, Guangdong (CN)

(72) Inventors: Weidong Zhong, Guangdong (CN); Shangkun Wu, Guangdong (CN); Yangyang Li, Guangdong (CN); Li Fan, Guangdong (CN)

(73) Assignee: Comba Network Systems Company Limited (CN)

( * ) Notice: Subject to any disclaimer, the term of this patent is extended or adjusted under 35 U.S.C. 154(b) by 0 days.

(21) Appl. No.: 17/762,224

(22) PCT Filed: Dec. 11, 2019

(86) PCT No.: PCT/CN2019/124691
§ 371 (c)(1),
(2) Date: Mar. 21, 2022

(87) PCT Pub. No.: WO2021/056846
PCT Pub. Date: Apr. 1, 2021

(65) Prior Publication Data
US 2022/0416893 A1    Dec. 29, 2022

(30) Foreign Application Priority Data
Sep. 27, 2019 (CN) .......................... 201910927703.1

(51) Int. Cl.
*H04B 10/2575* (2013.01)
*H04J 14/02* (2006.01)
*H04Q 11/00* (2006.01)

(52) U.S. Cl.
CPC .... *H04B 10/25752* (2013.01); *H04J 14/0282* (2013.01); *H04Q 11/0005* (2013.01)

(58) Field of Classification Search
CPC ........... H04J 14/0282; H04B 10/25752; H04B 10/2575; H04Q 11/0005
See application file for complete search history.

(56) References Cited

U.S. PATENT DOCUMENTS 6,950,637 B2 * 9/2005 Kim .......................... H03F 1/56
                                                                          455/132
2004/0197103 A1 * 10/2004 Roberts .............. H04B 10/2543
                                                                          398/159
(Continued)

FOREIGN PATENT DOCUMENTS

CN          201274476 Y        7/2009
CN          202282871 U        6/2012
(Continued)

OTHER PUBLICATIONS

Extended European Search Report for Application No. 19947311.7 dated Oct. 13, 2022. 9 pgs.
(Continued)

*Primary Examiner* — Pranesh K Barua
(74) *Attorney, Agent, or Firm* — Lerner David LLP

(57) ABSTRACT

An ROF communication remote machine and an ROF system are disclosed. The machine comprises a first packaging module and a second packaging module. The first packaging module comprises a first branch and a second branch. The first branch is used for converting a downlink optical signal, and sending the downlink electrical signal to the second packaging module. The second branch receives the downlink electrical signal, converts the downlink electrical signal into a downlink optical signal, sends the downlink optical signal to the local machine, receives an uplink electrical signal, and sends the uplink electrical signal to the local machine. The second packaging module is used for amplifying the power of the downlink electrical signal, filtering the downlink electrical signal, then feeding back the
(Continued)

downlink electrical signal to another component, receiving the uplink electrical signal, and sending the uplink electrical signal to the second port.

10 Claims, 8 Drawing Sheets

(56) References Cited

U.S. PATENT DOCUMENTS

| | | | |
|---|---|---|---|
| 2005/0286907 A1* | 12/2005 | Masuda | H04B 10/25758 398/186 |
| 2007/0133995 A1* | 6/2007 | Lee | H04B 10/25758 398/115 |
| 2007/0147273 A1 | 6/2007 | Lee et al. | |
| 2007/0258432 A1* | 11/2007 | Lee | H04B 10/25758 370/347 |
| 2008/0145061 A1* | 6/2008 | Lee | H04B 10/25758 398/139 |
| 2008/0219670 A1* | 9/2008 | Kim | H04B 10/25758 398/115 |
| 2009/0116843 A1 | 5/2009 | Rohde | |
| 2010/0329680 A1* | 12/2010 | Presi | H04J 14/025 398/79 |
| 2016/0112134 A1* | 4/2016 | Masunaga | H04B 10/25753 398/115 |

FOREIGN PATENT DOCUMENTS

| | | |
|---|---|---|
| CN | 205921592 U | 2/2017 |
| EP | 1343335 A1 | 9/2003 |
| EP | 2018722 A1 | 1/2009 |

OTHER PUBLICATIONS

International Search Report for PCT/CN2019/124691 dated Jun. 22, 2020. 3 pgs.

* cited by examiner

ROF COMMUNICATION REMOTE MACHINE AND ROF SYSTEM

CROSS-REFERENCE TO RELATED APPLICATION

This application is a U.S. national stage application, filed under 35 U.S.C. § 371, of International Patent Application No. PCT/CN2019/124691, filed on Dec. 11, 2019, which claims priority from Chinese Application No. 201910927703.1, filed Sep. 27, 2019, all of which is incorporated by reference herein in its entirety.

TECHNICAL FIELD

The present application relates to the technical field of wireless communication, and in particular, to a ROF communication remote machine and ROF system.

BACKGROUND

In the ROF (radio over fiber) communication system, the last stage in a remote unit is usually a power amplifier tube, which is used to amplify a signal to a specified power, and then radiate it to a specified area through an antenna. The ROF technology includes modulating microwaves onto lasers, and the modulated light waves are propagated through an optical link, and finally received and demodulated by a base station, and the demodulated microwaves are radiated by an antenna. In order to amplify the signal without distortion, it is necessary to linearize the power amplifier tube.

The most common linearization technologies for power amplifier tubes in the prior art are the analog pre-distortion technology and the DPD (digital pre-distortion, digital pre-distortion) technology. Among them, the digital pre-distortion is cascaded with a power amplifier element through a pre-distortion element, and the nonlinear distortion function exists between signal processing domains, which is equal to the amount of amplifier distortion, and the distortion function is opposite to achieve a highly linear, distortion-free system. However, the deviation of nonlinear distortion varies with time, temperature, and bias voltage. It is necessary to use a feedback mechanism to sample and feedback the output signal, and use a correction pre-distortion algorithm to add a nonlinear circuit to compensate for the nonlinearity of the power amplifier, and to sample and analyze the feedback signal to generate a real-time changing downlink input signal. Thereby, the nonlinearity of the power amplifier tube is corrected in real time.

The feedback architecture adopted in the prior art is based on the idea of independent non-modular design modules for the feedback link and the uplink. Taking into account the FDD (Frequency Division Duplexing) system and the TDD (Time Division Duplexing) system, the FDD is a technology that uses two independent channels to transmit information down and up, respectively. The TDD is a technique for timely distinguishing a wireless channel and a continuous uplink operation in a downlink operation of a frame period. Under this feedback structure, the TDD system has not yet achieved a lower cost. When replacing different systems, different frequency bands, and different transmission power levels, it is necessary to redesign the entire TDD or FDD remote module, or the PCB of the TDD or FDD remote module. In the market environment that needs to quickly occupy the market to gain share, it has been difficult to be accepted by the market environment.

To sum up, the prior art is aimed at the ROF system, and can effectively solve the problem of distortion during signal amplification, and the DPD technology can be used to correct the nonlinearity of the power amplifier tube in real time. However, since the TDD system has not been fully developed, there may be potential frequent module design replacements in the future. Moreover, in the ROF system, the process of switching between various standards, between frequency bands, and between transmission levels is still cumbersome, and the entire module needs to be redesigned, which consumes a lot of manpower, material resources and development costs. It is not conducive to the rapidly changing market, making it difficult for the existing technology to quickly occupy the market share to cope with the competitive environment.

SUMMARY

The feedback architecture currently adopted in the industry is based on the idea of independent design of feedback link and uplink. Although it takes into account both the FDD standard and the TDD standard, this method has not achieved the lowest cost under the TDD standard. If it is needed to replace different standards, different frequency bands, and different transmit power levels, it is needed to redesign and develop the entire module, which requires a lot of manpower, material resources and time. It has rapidly launched products and gained market share, and has been unable to adapt to the increasingly fierce competition environment.

A first aspect of the present application provides an ROF communication remote machine, including a first packaging module and a second packaging module;
  the first packaging module comprises a wavelength division multiplexer, a first branch connected to the wavelength division multiplexer, and a second branch, and the second branch being connected to the second packaging module through a first port and a second port; wherein
  the first branch is used to convert a downlink optical signal received from a local machine by the wavelength division multiplexer into a downlink electrical signal, and send the downlink electrical signal to the second packaging module;
  the second branch is used to receive the downlink electrical signal fed back by the first port, convert it into a downlink optical signal, and send the downlink optical signal to the local machine through the wavelength division multiplexer, and is used to receive an uplink electrical signal sent by the second port and convert the uplink electrical signal into an uplink optical signal, and then send the uplink optical signal to the local machine through the wavelength division multiplexer;
  the second packaging module is used to amplify the power of a downlink electrical signal, send and feed back the downlink electrical signal to the first port through the antenna after filtering, and receive an uplink electrical signal through the antenna, and send the uplink electrical signal to the second port after filtering and power-amplifying.

A second aspect of the present application provides an ROF system with digital pre-distortion, the ROF system with digital pre-distortion comprising:
  a local machine for modulating and frequency-converting a downlink signal, then converting the downlink signal into a downlink optical signal via a laser, and sending the downlink optical signal to a ROF communication remote machine, and for receiving a feedback signal and/or an uplink signal sent by the ROF communication remote machine, converting the feedback signal and/or the uplink signal into an optical signal through a detector, and sending the optical signal to a baseband unit by frequency conversion and demodulation; and the ROF communication remote machine in the embodiments provided by the first aspect of the present application.

The ROF communication remote machine provided by the present application can solve the problem of rapid reconfiguration of products that require different standards, different frequency bands, different transmission powers and other indicators when the prior art is applied to the ROF system. This method adopts the structure of sub-modules. When the TDD and FDD modes need to be replaced, only the modules need to be switched. Universal remote modules do not need to be redesigned, and detectors, low-noise amplifiers, lasers, and down-conversion in the TDD standard do not need to be in the form of patches, thus reducing cost and power consumption, and reducing time spent on the design of the PCB of the local machine. The method does not need to redesign and re-develop the entire product, and does not need to spend a lot of manpower, material resources and time, and can quickly launch the product and occupy the market to gain share, so it can take the lead in the competition.

DETAILED DESCRIPTION

Figure 1:
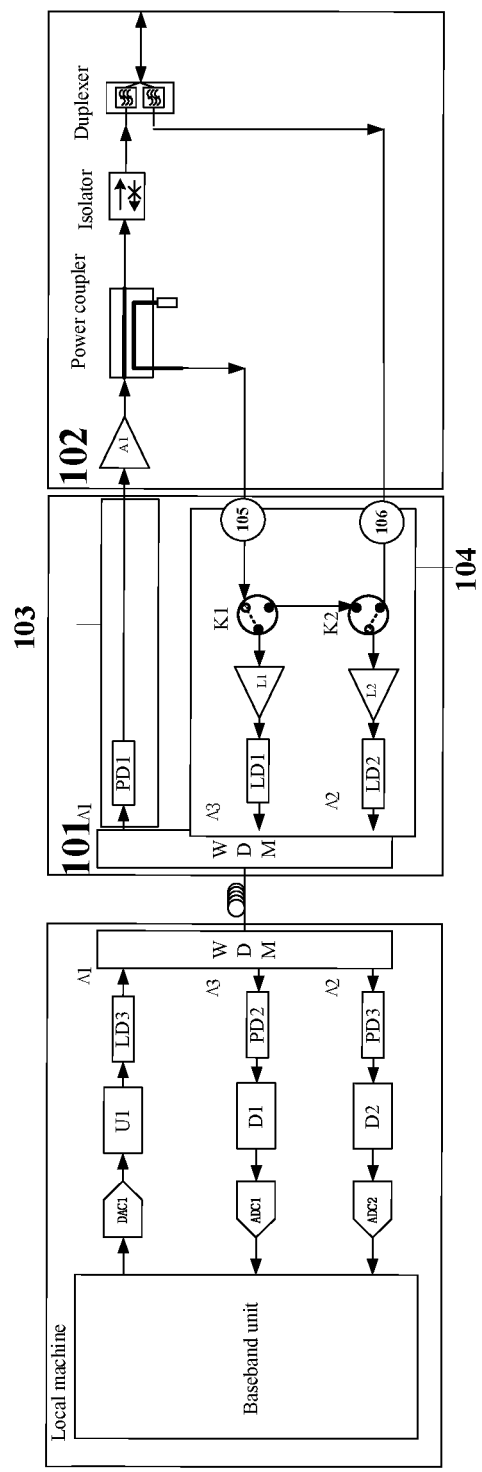
FIG. 1 is a schematic diagram of a ROF communication system under the FDD standard.

In order to make the objects, technical solutions and advantages of the present application clearer, the present application will be further described in detail below with reference to the accompanying drawings. Obviously, the described embodiments are only a part of the embodiments of the present application, but not all of the embodiments. Based on the embodiments of the present application, all other embodiments obtained by persons of ordinary skill in the art without creative efforts shall fall within the protection scope of the present application.

For the convenience of understanding, the terms involved in the embodiments of the present application are explained below:

1) WDM (Wavelength Division Multiplexing) is a technology that combines two or more optical carrier signals of different wavelengths (carrying various information) at a transmitting end through a multiplexer (also known as a Multiplexer), and couples the combined signal to a same optical fiber line for transmission. At a receiving end, the optical carriers of various wavelengths are separated by a demultiplexer (also called a demultiplexer), and then further processed by an optical receiver to restore the original signals. This technology of transmitting two or many different wavelengths of optical signals in the same fiber at the same time is called wavelength division multiplexing.

2) Optocoupler is an electrical-optical-electrical conversion device that transmits electrical signals with light as the medium. It consists of a light-emitting source and a light-receiver, which are assembled in the same closed casing and isolated from each other by a transparent insulator. The pin of the light-emitting source is the input end, the pin of the receiver is the output end. The common light source is light emitting diode, and the light receiver is photodiode, phototransistor and so on.

3) Circulator is a device that transmits electromagnetic waves in a unidirectional ring. The principle of the circulator is that the magnetic field biases the anisotropic properties of the ferrite material.

4) Isolator adopts the principle of linear optocoupler isolation to convert and output the input signal. The input end, output end and the working power supply are isolated from each other, which is especially suitable for use with equipment and meters that require electrical isolation. Isolators, also known as signal isolators, are an important part of industrial control systems.

5) Diplexer is the main accessory of inter-frequency duplex radio and repeater. Its function is to isolate the transmitting and receiving signals to ensure that both receiving and transmitting can work normally at the same time. It is composed of two band-stop filters with different frequencies to avoid the transmission of the machine's transmitted signal to the receiver.

6) Up conversion is a process of converting an input signal with a certain frequency into an output signal with a higher frequency (usually without changing the information content and modulation method of the signal). In the receiver, if the IF signal obtained after mixing is lower than the original signal, then this mixing method is called down-conversion. The purpose of down-conversion is to reduce the carrier frequency of the signal, or directly remove the carrier frequency to obtain a baseband signal.

Figure 2:
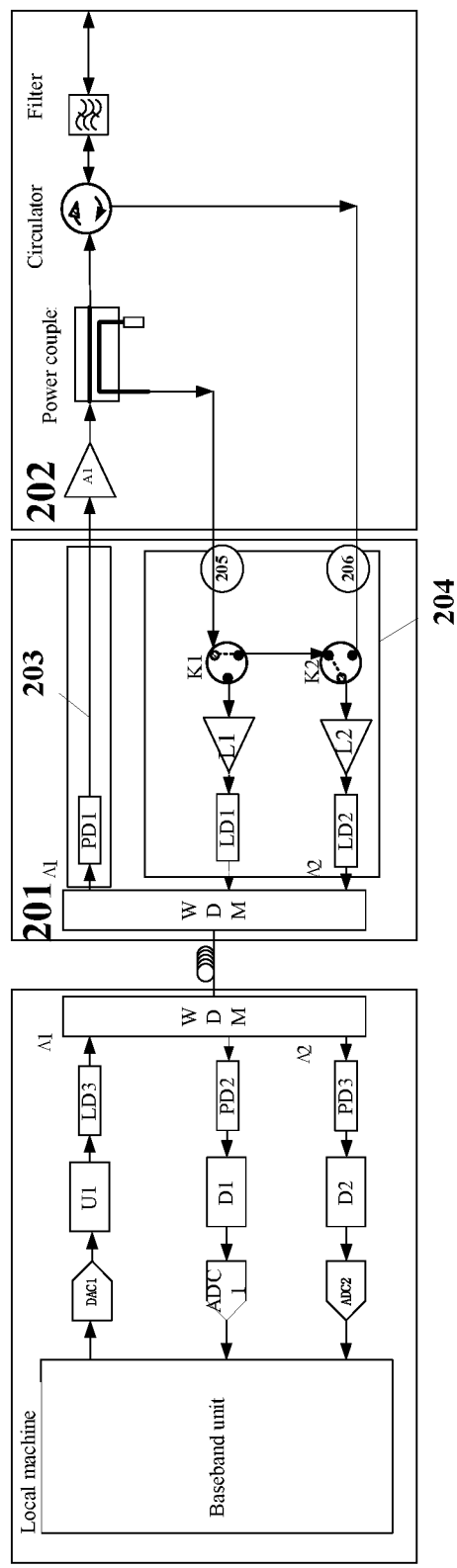
FIG. 2 is a schematic diagram of a ROF communication system under the TDD standard.

FIG. 1 is a schematic diagram of a ROF communication system involved in the application. The system includes a local machine and a remote machine, wherein the remote machine includes a first packaging module 101 and a second packaging module 102, wherein FIG. 1 is a schematic structural diagram of the FDD standard, and FIG. 2 is a schematic structural schematic of the TDD standard.

The first packaging module 101 is connected to the local machine, and the first packaging module 101 is connected to the second packaging module 102. The first packaging module 101 is located between the local machine and the second packaging module 102. The first packaging module 101 includes a wavelength division multiplexer WDM, a first branch 103 and a second branch 104 connected to the wavelength division multiplexer. The second branch is composed of a feedback second branch and an uplink second branch. The feedback second branch includes a first port 105, the second uplink branch includes a second port 106, and the first port 105 and the second port 106 are connected to the second packaging module 102. The first port 105 includes a first selection switch K1, and the second port 106 includes a second selection switch K2. The downlink signal is sent from the local machine to the second packaging module 102 via the first branch 103 of the first packaging module 101, and the downlink signal is sent through the second packaging module 102. The downlink feedback signal is transmitted by the second packaging module 102 to the first packaging module 101 through the first selection switch K1 in the first port 105 in the feedback second branch of the first packaging module 101, and sent by the first packaging module 101 to the local machine. The downlink feedback signal is selected and transmitted by the second packaging module 102 to the first packaging module 101 through the first selection switch K1 in the first port 105 in the feedback second branch of the first packaging module 101, and sent by the first packaging module 101 to the local machine. The uplink signal is transmitted to the first packaging module 102 by the second selection switch K2 in the second port 106 of the uplink second branch of the second packaging module 102, and sent to the local machine by the first packaging module 102.

In the embodiment of the present application, the purpose of splitting the ROF communication remote machine into the first packaging module and the second packaging module is that when the ROF communication system needs to be replaced with different standards, different frequency bands, and different transmit power levels, the first packaging module can complete the switching between TDD and FDD without redesigning of itself. When switching standards, different frequency bands, and different transmit power levels, for the components in the second packaging module, it is only necessary to perform patching of devices with different frequency bands, different power levels, the same package, and the same pin definition. In addition, in the TDD standard, the design of the detector LD1, low noise amplifier L1, laser PD2, down-conversion D1, and ADC1 in the feedback second branch can be saved. Therefore, this method of rapid reconstruction of the ROF system does not need to consume a lot of manpower, material resources and time, and can quickly launch products, occupy the market and gain share, and reduce the cost of products.

Embodiment 1

An embodiment of the present application provides an ROF communication remote machine under the FDD standard. As shown in FIG. 1, the ROF communication remote machine includes a first packaging module 101 and a second packaging module 102. Here, the first packaging module 101 includes a wavelength division multiplexer, and a first branch 103 and a second branch 104 both of which are connected to the wavelength division multiplexer. The first branch 103 includes a laser PD1, and the second branch 104 connected to the second packaging module is further divided into a feedback second branch and an uplink second branch. The feedback second branch has a first selection switch K1, the first selection switch K1 is connected to the first port 105 and a low-noise amplifier L1, and the low-noise amplifier L1 is connected to the WDM through a detector LD1. The uplink second branch has a second selection switch K2, the second selection switch K2 is connected to the second port 105 and a low-noise amplifier L2, and the low-noise amplifier L2 is connected to the WDM through a detector LD2.

The first selection switch K1 and the second selection switch K2 are single-pole double-throw switches, and each selection switch has a fixed end and two selection ends.

In the first selection switch K1, one end connected to the second packaging module 102 is the fixed end, and the other two ends are the selection ends.

In the second selection switch K2, one end connected with the wavelength division multiplexer WDM is the fixed end, and the other two ends are the selection ends.

At the time of uplink, the fixed end of the first selection switch K1 is connected to the selection end of a side connected to the wavelength division multiplexer WDM, and the connection between the first port 105 and the wavelength division multiplexer WDM is selectively switched on. The fixed end of the second selection switch K2 is connected to a selection end on a side of the second packaging module 102, and the connection between the second port 106 and the wavelength division multiplexer WDM is selectively switched on.

Figure 3:
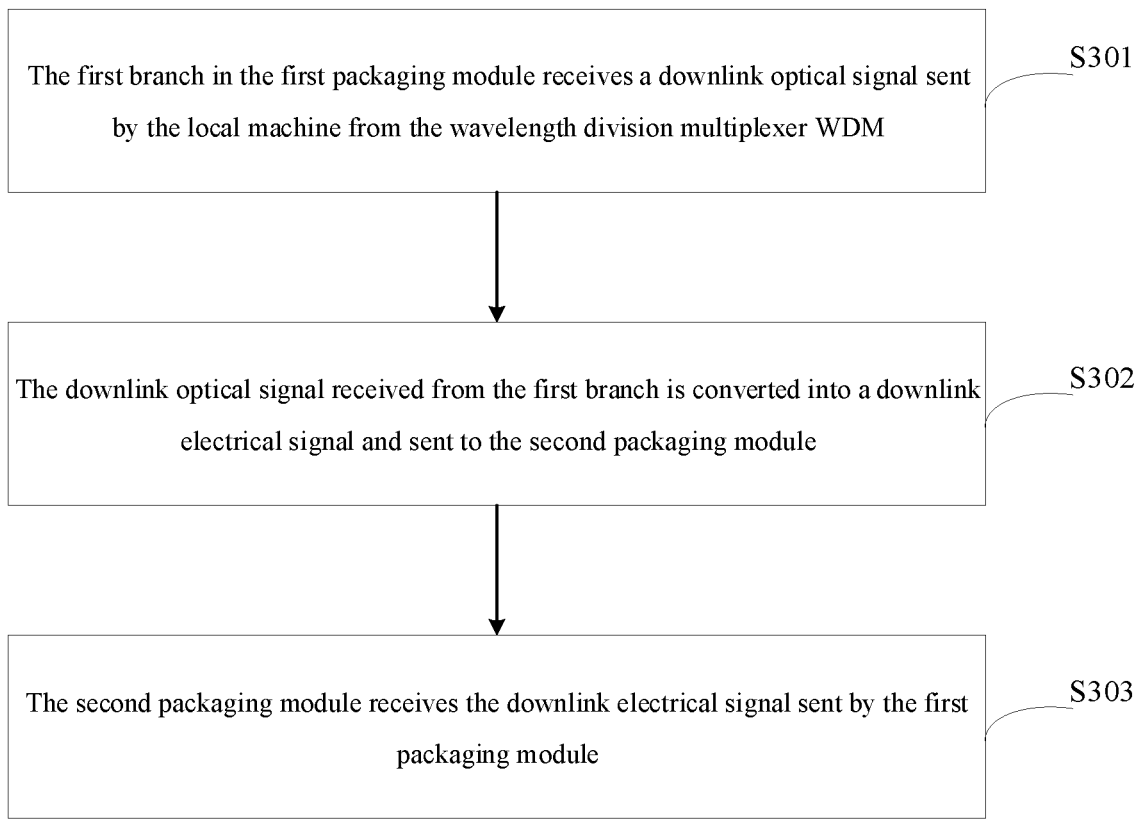
FIG. 3 is a schematic diagram of sending steps of a downlink signal of the FDD standard.

At the time of downlink, the fixed end of the first selection switch K1 is connected to the selection end of a side connected to the wavelength division multiplexer WDM, and the connection between the first port 105 and the wavelength division multiplexer WDM is selectively switched on. The fixed end of the second selection switch K2 is connected to the selection end on a side of the second packaging module 102, and the connection between the second port 106 and the wavelength division multiplexer WDM is selectively switched on. The sending steps of the downlink signal in the FDD standard are shown in FIG. 3 below.

Step S301: the first branch in the first packaging module receives a downlink optical signal sent by the local machine from the wavelength division multiplexer WDM;
    the near-end machine receives the downlink signal from the baseband unit, and through the near-end machine, converts the downlink signal into a downlink optical signal with a wavelength of λ1; the downlink optical signal is transmitted through the wavelength division multiplexer, the downlink optical signal and the light of other wavelengths are gathered together by the wavelength division multiplexer, and sent to the first packaging module in the far end machine. The downlink optical signal with wavelength λ1 is separated at the wavelength division multiplexer WDM of the first packaging module.

Step S302: the downlink optical signal received from the first branch is converted into a downlink electrical signal and sent to the second packaging module;
    the downlink optical signal received from the first branch and sent by the wavelength division multiplexer is converted into a downlink electrical signal by the laser PD1, and is sent to the second packaging module.

Step S303: the second packaging module receives the downlink electrical signal sent by the first packaging module;
    the power amplifier tube A1 of the second packaging module under the FDD standard amplifies the downlink electrical signal, the amplified downlink electrical signal passes through the power coupler, most of the power signal is sent to a circulator for processing, and finally the signal is filtered by a filter at the end, and finally the signal reaches the antenna port of the remote machine and is transmitted outside.

Figure 4:
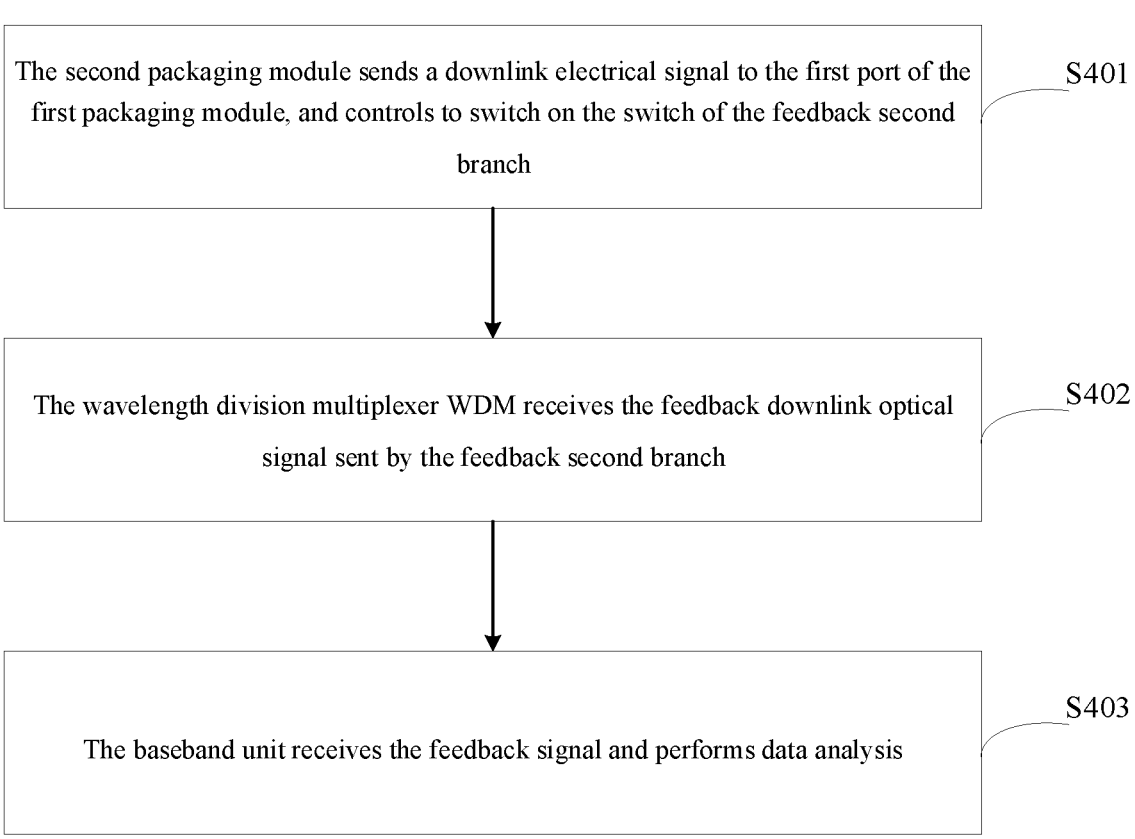
FIG. 4 is a schematic diagram of sending steps of a downlink feedback signal of the FDD standard.

The sending steps of the downlink feedback signal in the FDD standard are shown in FIG. 4 below.

Step S401: the second packaging module sends a downlink electrical signal to the first port of the first packaging module, and controls to switch on the switch of the feedback second branch;

the power amplifier tube amplifies the downlink electrical signal and sends it to the power coupler, wherein a part of the power signal is sent to the second branch of the first packaging module through the first port, and the second branch includes the feedback second branch and the second uplink branch; the part of the power downlink electrical signal is sent to the feedback second branch through the first port, wherein the feedback second branch includes a first selection switch K1; at this time, the first selection switch K1 selects to connect the fixed end to a selection end on a side connected to the wavelength division multiplexer WDM, and selectively switches on the connection between the first port and the wavelength division multiplexer WDM; the second selection switch K2 selects to connect the fixed end to the selection end on one side of the second packaging module, and selectively switches on the connection between the second port and the wavelength division multiplexer WDM. The downlink feedback signal is sent to the feedback second branch.

The feedback second branch receives a part of the power downlink electrical signal as the feedback downlink electrical signal, and sends the feedback downlink electrical signal to the low-noise amplifier L1 to process the downlink feedback electrical signal. The processed downlink feedback signal is converted into a feedback downlink optical signal λ2 through the detector LD1, and is sent to the wavelength division multiplexer WDM.

Step S402: The wavelength division multiplexer WDM receives the feedback downlink optical signal sent by the feedback second branch;

the wavelength division multiplexer WDM transmits the feedback downlink optical signal, and the wavelength division multiplexer WDM gathers the feedback downlink optical signal λ2 and light of other wavelengths together, and sends it to the local machine; the wavelength division multiplexer in the local machine separates the feedback downlink optical signal with wavelength λ2, and the separated feedback downlink optical signal is processed by the local machine, converted into a feedback signal, and sent to the baseband unit.

Step S403: the baseband unit receives the feedback signal and performs data analysis;

the baseband unit performs data analysis on the feedback baseband signal received from the local machine, and analyzes the distortion model of the power amplifier tube; the DPD pre-distortion algorithm is performed according to the distortion model to generate a new set of pre-distorted downlink baseband signals; the sending process of the downlink signal is carried out again, so that the nonlinearity of the power amplifier tube is corrected in real time, so as to realize the pre-distortion of the signal.

Figure 5:
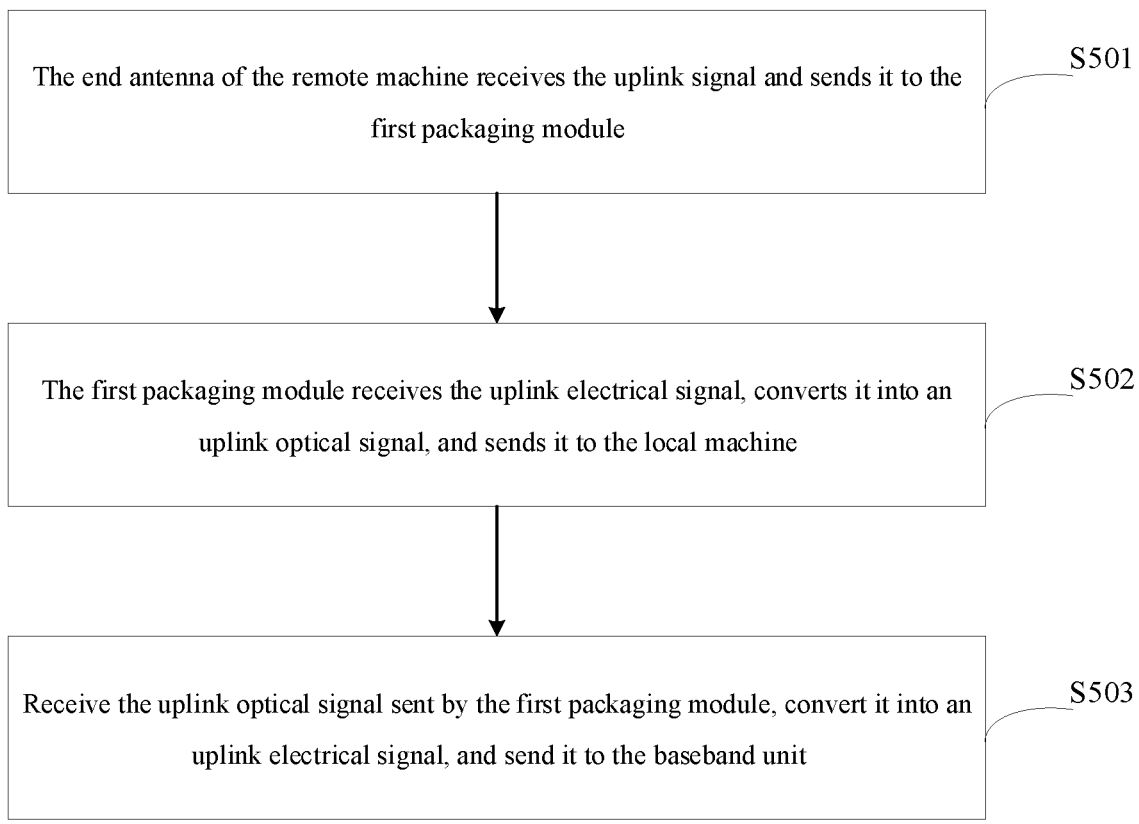
FIG. 5 is a schematic diagram of sending steps of an uplink signal of the FDD standard.

The sending steps of the uplink signal of the FDD standard are shown in FIG. 5 below.

Step S501: the end antenna of the remote machine receives the uplink signal and sends it to the first packaging module.

Under the FDD standard, the filter in the second packaging module filters the uplink signal, sends the filtered uplink signal to the circulator for processing, and sends the uplink electrical signal from the circulator to the first packaging module.

Step S502: the first packaging module receives the uplink electrical signal, converts it into an uplink optical signal, and sends it to the local machine;

the second branch in the first packaging module includes a feedback second branch and an uplink second branch, and the uplink electrical signal is sent to the uplink second branch; the uplink second branch includes a second selection switch K2, which sends the uplink electrical signal to the uplink second branch; at this time, the first selection switch K1 selects the fixed end to be connected to the selection end on a side connected to the wavelength division multiplexer WDM, and selectively switches on the connection between the first port and the wavelength division multiplexer WDM; the second selection switch K2 selects the fixed end to be connected to the selection end on a side of the second packaging module, and selectively switches on the connection between the second port and the wavelength division multiplexer WDM.

The uplink second branch in the second branch is connected to the wavelength division multiplexer WDM, and the uplink electrical signal is sent to the low noise amplifier L2 for processing. The processed uplink electrical signal is converted into an uplink optical signal λ3 through the detector LD2 and sent to the wavelength division multiplexer WDM.

Step S503: receiving the uplink optical signal sent by the first packaging module, converting it into an uplink electrical signal, and sending it to the baseband unit;

the wavelength division multiplexer WDM transmits the uplink optical signal, and the wavelength division multiplexer WDM gathers the uplink optical signal λ3 and the light of other wavelengths together, and sends it to the local machine; the wavelength division multiplexer in the local machine separates the uplink optical signal with a wavelength of λ3, converts the separated uplink optical signal into an uplink signal through the local machine, and sends it to the baseband unit.

When the ROF communication remote machine under the FDD standard needs to replace the input signal of different power levels, it only needs to replace the patches of the devices with different power levels, the same package, and the same pin definition. For example, when the power of the uplink signal is replaced, it is only necessary to replace the duplexer in the second packaging module and the low noise amplifier L2 in the first packaging module with patch devices of different power levels, the same package, and the same pin definition.

In addition, when the ROF communication remote machine under the FDD system needs to switch from the FDD system to the TDD system, it only needs to switch the corresponding second packaging module under FDD to the second packaging module under TDD. The connection method and signal direction of other ports remain unchanged. Moreover, at the downlink moment of the TDD system, by selecting the first selection switch K1, the fixed end is selected to be connected to the selection end on a side of the second selection switch K2, and then the connection between the first port and the second selection switch K2 is selected to be switched on. In addition, the second selection switch K selectively connects the fixed end to the selection end on one side of the first selection switch K1, thereby selectively switching on the connection between the second selection switch K2 and the first selection switch K1. Through this connection mode, the feedback downlink signal switched to the TDD standard can be sent to the first packaging module through the uplink second branch. In this case, the device of the feedback second branch may not be specifically designed.

Embodiment 2

An embodiment of the present application provides an ROF communication remote machine under the TDD standard. As shown in FIG. 2, the ROF communication remote machine includes a first packaging module 201 and a second packaging module 202. Here, the first packaging module 201 includes a wavelength division multiplexer, and a first branch 203 and a second branch 204 both of which are connected to the wavelength division multiplexer. The first branch 203 includes a laser PD1, and the second branch 204 connected to the second packaging module is further divided into a feedback second branch and an uplink second branch. The feedback second branch has a first selection switch K1, the first selection switch K1 is connected to the first port 205 and a low-noise amplifier L1, and the low-noise amplifier L1 is connected to the WDM through a detector LD1. The uplink second branch has a second selection switch K2, the second selection switch K2 is connected to the second port 205 and a low-noise amplifier L2, and the low-noise amplifier L2 is connected to the WDM through a detector LD2.

The first selection switch K1 and the second selection switch K2 are single-pole double-throw switches, and each selection switch has a fixed end and two selection ends.

In the first selection switch K1, one end connected to the second packaging module 202 is the fixed end, and the other two ends are the selection ends.

In the second selection switch K2, one end connected with the wavelength division multiplexer WDM is the fixed end, and the other two ends are the selection ends.

At the time of uplink, the fixed end of the first selection switch K1 is connected to the selection end of a side connected to the wavelength division multiplexer WDM, and the connection between the first port 205 and the wavelength division multiplexer WDM is selectively switched on. The fixed end of the second selection switch K2 is connected to a selection end on a side of the second packaging module 202, and the connection between the second port 206 and the wavelength division multiplexer WDM is selectively switched on.

At the time of downlink, the fixed end of the first selection switch K1 is connected to the selection end of a side connected to the wavelength division multiplexer WDM, and the connection between the first port 205 and the wavelength division multiplexer WDM is selectively switched on. The fixed end of the second selection switch K2 is connected to the selection end on a side of the second packaging module 202, and the connection between the second port 206 and the wavelength division multiplexer WDM is selectively switched on.

As an optional implementation manner, at the time of downlink, by selecting the first selection switch K1, the fixed end is selected to be connected to the selection end on a side of the second selection switch K2, and the connection between the first port 205 and the second selection switch K2 is selectively switched on. In addition, the second selection switch K2 selectively connects the fixed end to the selection end on a side of the first selection switch K1, and selectively switches on the connection between the second selection switch K2 and the first selection switch K1. Through this connection mode, the feedback downlink signal switched to the TDD standard can be sent to the first packaging module 201 through the uplink second branch.

The sending steps of the downlink signal of TDD system are roughly the same as that of FDD. Only the second packaging module differs in the signal processing method of the downlink signal at the end. Those skilled in the art should be aware of this difference, and no further description is provided here.

Figure 6:
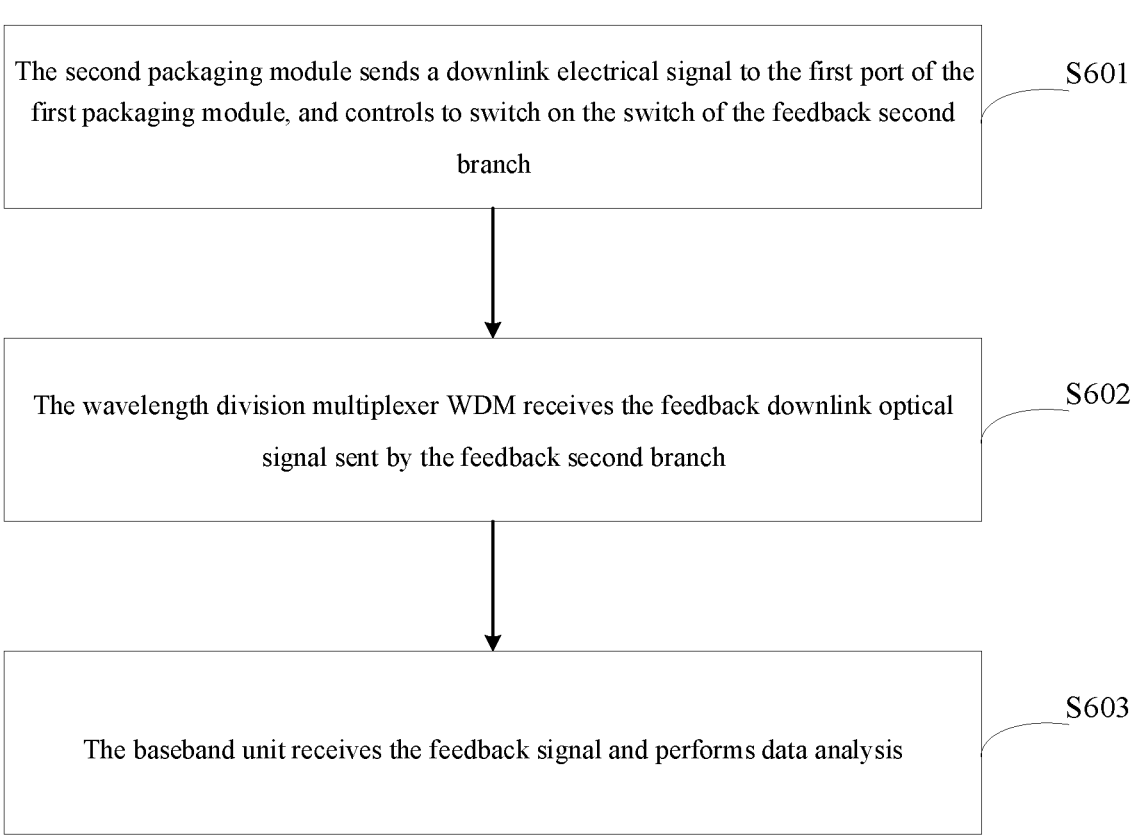
FIG. 6 is a schematic diagram of sending steps of a downlink feedback signal of the TDD standard.

The sending steps of the downlink signal in the TDD standard are shown in FIG. 6 below.

Step S601: the second packaging module sends a downlink electrical signal to the first port of the first packaging module, and controls to switch on the switch of the feedback second branch;

the power amplifier tube amplifies the downlink electrical signal and sends it to the power coupler, wherein a part of the power signal is sent to the second branch of the first packaging module through the first port, and the second branch includes the feedback second branch and the second uplink branch. The part of the power downlink electrical signal is sent to the feedback second branch through the first port, wherein the feedback second branch includes a first selection switch K1. At this time, the first selection switch K1 selects to connect the fixed end to a selection end on a side connected to the wavelength division multiplexer WDM, and selectively switches on the connection between the first port and the wavelength division multiplexer WDM. The second selection switch K2 selects to connect the fixed end to the selection end on one side of the second packaging module, and selectively switches on the connection between the second port and the wavelength division multiplexer WDM. The downlink feedback signal is sent to the feedback second branch. The feedback second branch receives a part of the power downlink electrical signal as the feedback downlink electrical signal, and sends the feedback downlink electrical signal to the low-noise amplifier L1 to process the downlink feedback electrical signal. The processed downlink feedback signal is converted into a feedback downlink optical signal λ2 through the detector LD1, and is sent to the wavelength division multiplexer WDM.

Step 602: The wavelength division multiplexer WDM receives the feedback downlink optical signal sent by the feedback second branch;

The wavelength division multiplexer WDM transmits the feedback downlink optical signal, and the wavelength division multiplexer WDM gathers the feedback downlink optical signal λ2 and light of other wavelengths together, and sends it to the local machine. The wavelength division multiplexer in the local machine separates the feedback downlink optical signal with wavelength λ2, and the separated feedback downlink optical signal is processed by the local machine, converted into a feedback signal, and sent to the baseband unit.

Step S603: the baseband unit receives the feedback signal and performs data analysis;

the baseband unit performs data analysis on the feedback baseband signal received from the local machine, and analyzes the distortion model of the power amplifier tube; the DPD pre-distortion algorithm is performed according to the distortion model to generate a new set of pre-distorted downlink baseband signals; the sending process of the downlink signal is carried out again, so that the nonlinearity of the power amplifier tube is corrected in real time, so as to realize the pre-distortion of the signal.

The sending steps of the uplink signal of TDD system are roughly the same as that of FDD. Only the second packaging module differs in the signal processing method of the uplink signal at the end. Those skilled in the art should be aware of this difference, and no further description is provided here.

When the ROF communication remote machine under the TDD standard needs to replace the input signal of different power levels, it only needs to replace the patches of the devices with different power levels, the same package, and the same pin definition. For example, when the power of the uplink signal is replaced, it is only necessary to replace the filter in the second packaging module and the low noise amplifier L2 in the first packaging module with patch devices of different power levels, the same package, and the same pin definition.

In addition, when the ROF communication remote machine under the TDD system needs to switch from the TDD system to the FDD system, it only needs to switch the corresponding second packaging module under TDD to the second packaging module under FDD. The connection method and signal direction of other ports remain unchanged.

Embodiment 3

This embodiment provides a remote machine for ROF communication applied in the TDD standard, including a first packaging module 701 and a second packaging module 702. The first packaging module 701 does not include a feedback second branch to save costs.

Figure 7:
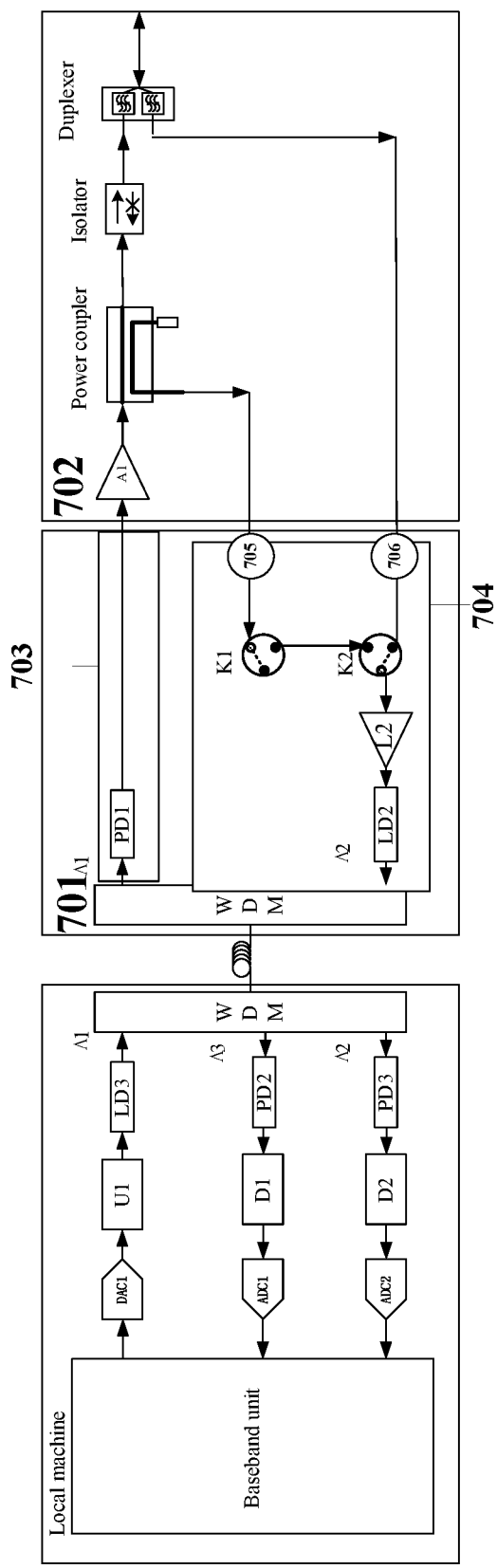
FIG. 7 is a schematic diagram of a cost-saving ROF communication system of the TDD standard.

As shown in FIG. 7, the ROF communication remote machine includes a first packaging module 701 and a second packaging module 702. Here, the first packaging module 701 includes a wavelength division multiplexer, and a first branch 703 and a second branch 704 both of which are connected to the wavelength division multiplexer. The first branch 703 includes a laser PD1, and the second branch 104 connected to the second packaging module includes an uplink second branch. The second branch includes a first port 705, the first port 705 is connected to a first selection switch K1, and the first switch K1 is connected to a second selection switch K2. The second uplink branch has a second selection switch K2, the second switch K2 is connected to a second port 706 and a low-noise amplifier L2, and the low-noise amplifier L2 is connected to the WDM through a detector LD2.

The first selection switch K1 and the second selection switch K2 are single-pole double-throw switches, and each selection switch has a fixed end and two selection ends.

In the first selection switch K1, one end connected to the second packaging module 702 is the fixed end, and the other two ends are the selection ends.

In the second selection switch K2, one end connected with the wavelength division multiplexer WDM is the fixed end, and the other two ends are the selection ends.

At the time of uplink, the connection mode of the first selection switch K1 is not limited. The fixed end of the second selection switch K2 is connected to a selection end on a side of the second packaging module 702, and the connection between the second port 106 and the wavelength division multiplexer WDM is selectively switched on.

At the time of downlink, the first selection switch K1 selects to connect the fixed end to the selection end on a side of the second selection switch K2, and selectively switches on the connection between the first port 705 and the second selection switch K2. The second selection switch K2 selectively connects the fixed end to the selection end on a side of the first selection switch, and selectively switches on the connection between the second selection switch K2 and the first selection switch K1.

Figure 8:
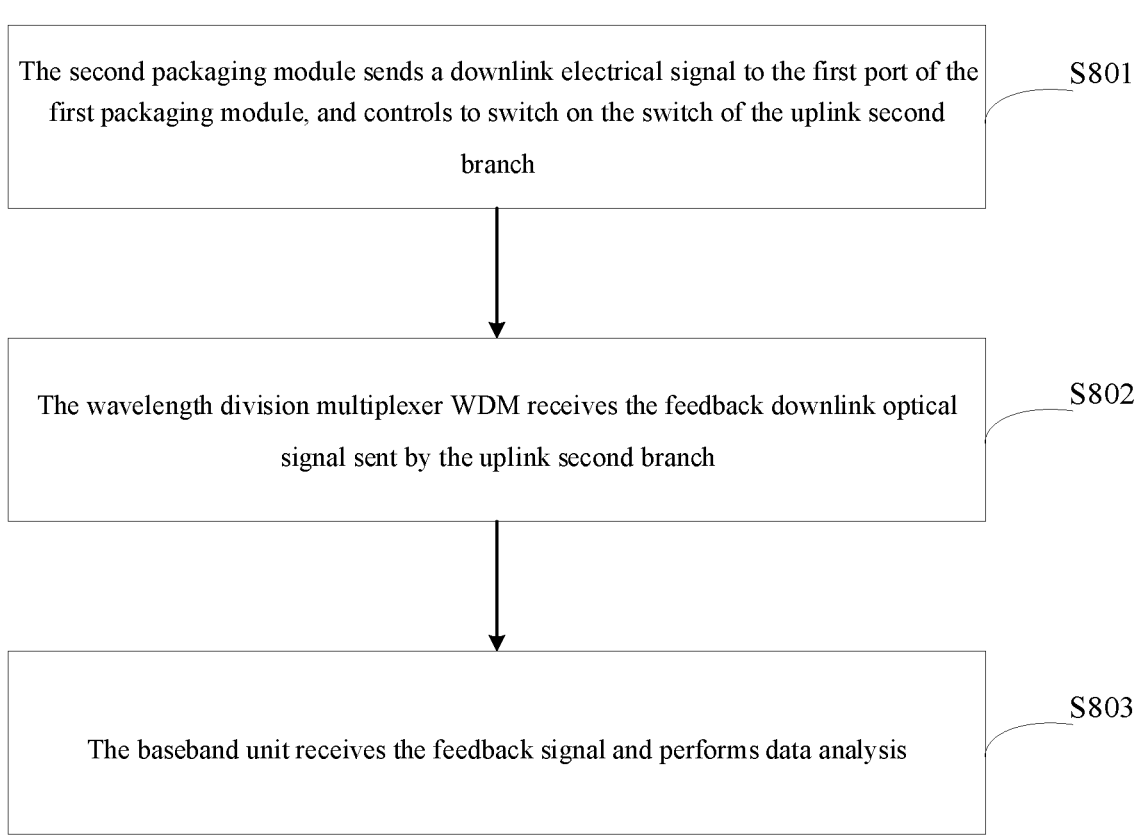
FIG. 8 is a schematic diagram of steps of sending a cost-saving downlink feedback signal under the TDD standard.

The sending steps of the downlink signal of TDD system are roughly the same as that of FDD. Only the second packaging module differs in the signal processing method of the downlink signal at the end. Those skilled in the art should be aware of this difference, and no further description is provided here. The sending steps of the downlink signal in the TDD standard are shown in FIG. 8 below.

Step S801: the second packaging module sends a downlink electrical signal to the first port of the first packaging module, and controls to switch on the switch of the uplink second branch;

The power amplifier tube amplifies the downlink electrical signal and sends it to the power coupler, wherein a part of the power signal is sent to the second branch of the first packaging module through the first port, and the second branch includes the feedback second branch and the second uplink branch. The part of the power downlink electrical signal is sent to the feedback second branch through the first port, wherein the feedback second branch includes a first selection switch K1. At this time, the first selection switch K1 selectively connects the fixed end to the selection end on a side connected to the second selection switch K2, and selectively switches on the connection between the first port and the second selection switch K2. The second selection switch K2 selectively connects the fixed end to the selection end on a side of the first selection switch K1, and selectively switches on the connection between the second selection switch K2 and the first selection switch K1. The downlink feedback signal is sent to the uplink second branch. The uplink second branch receives a part of the power downlink electrical signal as the feedback downlink electrical signal, and sends the feedback downlink electrical signal to the low-noise amplifier L2 to process the downlink feedback electrical signal. The processed downlink feedback signal is converted into a feedback downlink optical signal λ3 through the detector LD2, and is sent to the wavelength division multiplexer WDM.

Step 802: the wavelength division multiplexer WDM receives the feedback downlink optical signal sent by the uplink second branch;

the wavelength division multiplexer WDM transmits the feedback downlink optical signal, and the wavelength division multiplexer WDM gathers the feedback downlink optical signal λ3 and light of other wavelengths together, and sends it to the local machine; the wavelength division multiplexer in the local machine separates the feedback downlink optical signal with wavelength λ3, and the separated feedback downlink optical signal is processed by the local machine, converted into a feedback signal, and sent to the baseband unit.

Step S803: the baseband unit receives the feedback signal and performs data analysis;

the baseband unit performs data analysis on the feedback baseband signal received from the local machine, and analyzes the distortion model of the power amplifier tube; the DPD pre-distortion algorithm is performed according to the distortion model to generate a new set of pre-distorted downlink baseband signals; the sending process of the downlink signal is carried out again, so that the nonlinearity of the power amplifier tube is corrected in real time, so as to realize the pre-distortion of the signal.

The sending steps of the uplink signal of TDD system are roughly the same as that of FDD. Only the second packaging module differs in the signal processing method of the uplink signal at the end. Those skilled in the art should be aware of this difference, and no further description is provided here.

When the ROF communication remote machine under the TDD standard needs to replace the input signal of different power levels, it only needs to replace the patches of the devices with different power levels, the same package, and the same pin definition. For example, when the power of the uplink signal is replaced, it is only necessary to replace the filter in the second packaging module and the low noise amplifier L2 in the first packaging module with patch devices of different power levels, the same package, and the same pin definition.

In addition, when the ROF communication remote machine under the TDD system needs to switch from the TDD system to the FDD system, it only needs to switch the corresponding second packaging module under TDD to the second packaging module under FDD. The connection method and signal direction of other ports remain unchanged.

Embodiment 4

This embodiment provides an ROF system with digital pre-distortion, and the ROF system with digital pre-distortion includes:
- a local machine for modulating and frequency-converting a downlink signal, then converting the downlink signal into a downlink optical signal via a laser, and sending the downlink optical signal to a ROF communication remote machine, and for receiving a feedback signal and/or an uplink signal sent by the ROF communication remote machine, converting the feedback signal and/or the uplink signal into an optical signal through a detector, and sending the optical signal to a baseband unit by frequency conversion and demodulation;
- a ROF communication remote machine including a first packaging module and a second packaging module.

The first packaging module includes a wavelength division multiplexer, a first branch connected to the wavelength division multiplexer, and a second branch, and the second branch is connected to the second packaging module through a first port and a second port.

The first branch is used to convert a downlink optical signal received from a local machine by the wavelength division multiplexer into a downlink electrical signal, and send the downlink electrical signal to the second packaging module.

The second branch is used to receive the downlink electrical signal fed back by the first port, convert it into a downlink optical signal, and send the downlink optical signal to the local machine through the wavelength division multiplexer, and is used to receive an uplink electrical signal sent by the second port and convert the uplink electrical signal into an uplink optical signal, and then send the uplink optical signal to the local machine through the wavelength division multiplexer.

The second packaging module is used to amplify the power of the downlink electrical signal, transmit and feed back the downlink electrical signal to the first port through the antenna after filtering, and receive the uplink electrical signal through the antenna, and send the uplink electrical signal to the second port after being filtered and amplified.

Optionally, the second branch includes a feedback second branch and an uplink second branch.

The feedback second branch has a first selection switch for selectively switching on the connection between the first port and the wavelength division multiplexer, or switching on the connection between the first port and the second selection switch.

The uplink second branch has a second selection switch for selectively switching on the connection between the second port and the wavelength division multiplexer, or switching on the connection between the second selection switch and the first selection switch.

Optionally, the first selection switch selectively switches on the connection between the first port and the wavelength division multiplexer, and the second selection switch selectively switches on the connection between the second port and the wavelength division multiplexer.

Optionally, at the time of uplink, the first selection switch selectively switches on the connection between the first port and the wavelength division multiplexer, and the second selection switch selectively switches on the connection between the second port and the wavelength division multiplexer.

At the time of downlink, the first selection switch selectively switches on the connection between the first port and the wavelength division multiplexer, and the second selection switch selectively switches on the connection between the second selection switch and the wavelength division multiplexer.

Optionally, the ROF communication remote machine is in a TDD standard, and the second branch has a first selection switch and a second selection switch.

The second selection switch is used to selectively switch on the connection between the second port and the wavelength division multiplexer, or switch on the connection with the first selection switch. The first selection switch is used to switch on or off the connection between the first port and the second selection switch.

Optionally, at the time of uplink, the second selection switch selectively switches on the connection between the second port and the wavelength division multiplexer.

At the time of going down, the first selection switch is used to switch on the connection between the first port and the second selection switch, and the second selection switch selectively switches on the connection with the first selection switch.

Optionally, the first selection switch and/or the second selection switch are single pole double throw switches.

Optionally, the second branch includes:
- a low-noise amplifier for power-amplifying a downlink electrical signal fed back by a first port and sending it to a detector, and for power-amplifying an uplink electrical signal sent by a second port and sending it to the detector; and
- a detector for converting the received downlink electrical signal into a downlink optical signal, and for converting the received uplink electrical signal into an uplink optical signal.

Optionally, the ROF communication remote machine is in a TDD standard, and the second packaging module includes:
- a power amplifier, used for power-amplifying the downlink electrical signal sent by the first packaging module and sending it to a power coupler;
- a power coupler for separating the downlink electrical signal received from the power amplifier into two electrical signals, one of which is sent to a circulator, and the other signal is sent to the first port in the second branch in the form of a feedback downlink electrical signal;
- a circulator for receiving the downlink electrical signal from the power coupler and sending it to a filter, and receiving the uplink electrical signal from the filter and sending it to the second port of the second branch; and a filter for receiving the downlink electrical signal sent by the circulator, filtering the downlink electrical signal and sending it to an antenna, and receiving the uplink electrical signal sent by the antenna, filtering the uplink electrical signal and sending it into the circulator.

Optionally, the ROF communication remote machine is in a FDD standard, and the second packaging module includes:
   a power amplifier, used for power-amplifying the downlink electrical signal sent by the first packaging module and sending it to a power coupler;
   a power coupler for separating the downlink electrical signal received from the power amplifier into two electrical signals, one of which is sent to an isolator, and the other signal is sent to the first port in the second branch in the form of a feedback downlink electrical signal;
   an isolator for receiving the downlink electrical signal sent by the power coupler and sending it to the duplexer; and
   a duplexer for receiving a downlink electrical signal from the isolator and sending it to the antenna, and receiving an uplink electrical signal from the antenna and sending it into the second port in the second branch. As will be appreciated by those skilled in the art, the embodiments of the present application may be implemented in the form of a method, a system, or a computer program product. Accordingly, the present application may take the form of an entirely hardware embodiment, an entirely software embodiment, or an embodiment combining software and hardware. Furthermore, the present application may take the form of a computer program product embodied on one or more computer-usable storage media (including, but not limited to, disk storage, CD-ROM, optical storage, etc.) having computer-usable program code embodied therein.

The present application is described with reference to flowchart illustrations and/or block diagrams of methods, apparatus (systems), and computer program products according to the present application. It will be understood that each process and/or block in the flowchart illustrations and/or block diagrams, and combinations of processes and/or blocks in the flowchart illustrations and/or block diagrams, can be implemented by computer program instructions. These computer program instructions may be provided to the processor of a general-purpose computer, special purpose computer, embedded processor or other programmable data processing device to produce a machine, so that instructions are generated and are executed by a processor of a computer or other programmable data processing device to produce means for implementing the functions specified in one or more of the flowcharts and/or one or more blocks of the block diagrams.

These computer program instructions may also be stored in a computer readable memory capable of directing a computer or other programmable data processing device to function in a particular manner, causing instructions stored in the computer-readable memory to produce an article of manufacture comprising instruction means. The instruction means implements the functions specified in the flow or flows of the flowcharts and/or the block or blocks of the block diagrams.

These computer program instructions can also be loaded on a computer or other programmable data processing device to cause the computer or other programmable device to perform a series of operational steps to produce a computer-implemented process, such that instructions executing on a computer or other programmable device thus provide steps for implementing the functions specified in a flow or flows of the flowcharts and/or a block or blocks of the block diagrams.

Obviously, those skilled in the art can make various changes and modifications to the present application without departing from the spirit and scope of the present application. Thus, if these modifications and variations of the present application fall within the scope of the claims of the present application and their equivalents, the present application is also intended to include these modifications and variations.

What is claimed is:

1. A ROF communication remote machine, comprising a first packaging module and a second packaging module, wherein,
   the first packaging module comprises a wavelength division multiplexer, a first branch connected to the wavelength division multiplexer, and a second branch, and the second branch is connected to the second packaging module through a first port and a second port; wherein
   the first branch is configured to convert a downlink optical signal received from a local machine by the wavelength division multiplexer into a downlink electrical signal, and send the downlink electrical signal to the second packaging module;
   the second branch is configured to receive the downlink electrical signal fed back via the first port, convert it into a downlink optical signal, and send the downlink optical signal to the local machine through the wavelength division multiplexer, and is configured to receive an uplink electrical signal sent by the second port and convert the uplink electrical signal into an uplink optical signal, and then send the uplink optical signal to the local machine through the wavelength division multiplexer;
   the second packaging module is configured to amplify the power of the downlink electrical signal, send and feed back the downlink electrical signal to the first port, and receive the uplink electrical signal through an antenna, and send the uplink electrical signal to the second port;
   wherein, the second branch includes a feedback second branch comprising a first selection switch and an uplink second branch comprising a second selection switch, wherein,
   the first selection switch configured to selectively switch on a connection between the first port and the wavelength division multiplexer, or switch on a connection between the first port and the second selection switch, or the first selection switch is configured to switch on or off the connection between the first port and the second selection switch;
   the second selection switch is configured to selectively switch on a connection between the second port and the wavelength division multiplexer, or switch on a connection between the second selection switch and the first selection switch.

2. The ROF communication remote machine according to claim 1, wherein:
   the first selection switch selectively switches on the connection between the first port and the wavelength division multiplexer, and the second selection switch selectively switches on the connection between the second port and the wavelength division multiplexer.

3. The ROF communication remote machine according to claim 1, wherein:
   at a time of uplink electrical signal, the first selection switch selectively switches on the connection between the first port and the wavelength division multiplexer, and the second selection switch selectively switches on the connection between the second port and the wavelength division multiplexer; and at a time of downlink electrical signal, the first selection switch selectively switches on the connection between the first port and the wavelength division multiplexer, and the second selection switch selectively switches on the connection between the second selection switch and the wavelength division multiplexer.

4. The ROF communication remote machine according to claim 1, wherein the ROF communication remote machine is configured to adapt to a TDD standard; and the second selection switch is configured to selectively switch on the connection between the second port and the wavelength division multiplexer, or switch on the connection with the first selection switch, and the first selection switch is configured to switch on or off the connection between the first port and the second selection switch.

5. The ROF communication remote machine according to claim 4, wherein:

at a time of uplink electrical signal, the second selection switch selectively switches on the connection between the second port and the wavelength division multiplexer; and at a time of downlink electrical signal, the first selection switch selectively is switches on the connection between the first port and the second selection switch, and the second selection switch selectively switches on the connection with the first selection switch.

6. The ROF communication remote machine according to claim 1, wherein the first selection switch and/or the second selection switch are single pole double throw switches.

7. The ROF communication remote machine according to claim 1, wherein the second branch comprises:

a first low-noise amplifier and a second low-noise amplifier for power-amplifying the downlink electrical signal fed back by the first port and sending it to a detector, and for power-amplifying the uplink electrical signal sent by the second port and sending it to the detector; and wherein the detector converts the downlink electrical signal into the downlink optical signal, and converts the uplink electrical signal into the uplink optical signal.

8. The ROF communication remote machine according to claim 1, wherein the ROF communication remote machine is configured to adapt to a TDD standard, and the second packaging module comprises:

a power amplifier, configured for power-amplifying the downlink electrical signal sent by the first packaging module and sending it to a power coupler;

a power coupler for separating the downlink electrical signal received from the power amplifier into two electrical signals, one of which is sent to a circulator, and the other signal is sent to the first port in the second branch in the form of the downlink electrical signal;

a circulator for receiving the downlink electrical signal from the power coupler and sending it to a filter, and receiving the uplink electrical signal from the filter and sending it to the second port of the second branch; and a filter for receiving the downlink electrical signal sent by the circulator, filtering the downlink electrical signal and sending it to the antenna, and receiving the uplink electrical signal sent by the antenna, filtering the uplink electrical signal and sending it into the circulator.

9. The ROF communication remote machine according to claim 1, wherein the ROF communication remote machine is configured to adapt to an FDD standard, and the second packaging module comprises:

a power amplifier, configured for power-amplifying the downlink electrical signal sent by the first packaging module and sending it to a power coupler;

the power coupler for separating the downlink electrical signal received from the power amplifier into two electrical signals, one of which is sent to an isolator, and the other signal is sent to the first port in the second branch in the form of the downlink electrical signal;

an isolator for receiving the downlink electrical signal sent by the power coupler and sending it to a duplexer; and wherein the duplexer is for receiving the downlink electrical signal from the isolator and sending it to the antenna, and receiving the uplink electrical signal from the antenna and sending it into the second port in the second branch.

10. A ROF system with digital pre-distortion, comprising:

the local machine for modulating and frequency-converting the downlink signal, then converting the downlink signal into a downlink optical signal via a laser, and sending the downlink optical signal to the ROF communication remote machine, and for receiving the downlink electrical signal and/or the uplink electrical signal sent by the ROF communication remote machine, converting the downlink electrical signal and/or the uplink electrical signal into an optical signal through a detector, and sending the optical signal to a baseband unit by frequency conversion and demodulation; and the ROF communication remote machine as described in claim 1.

* * * * *